Patented Jan. 12, 1932

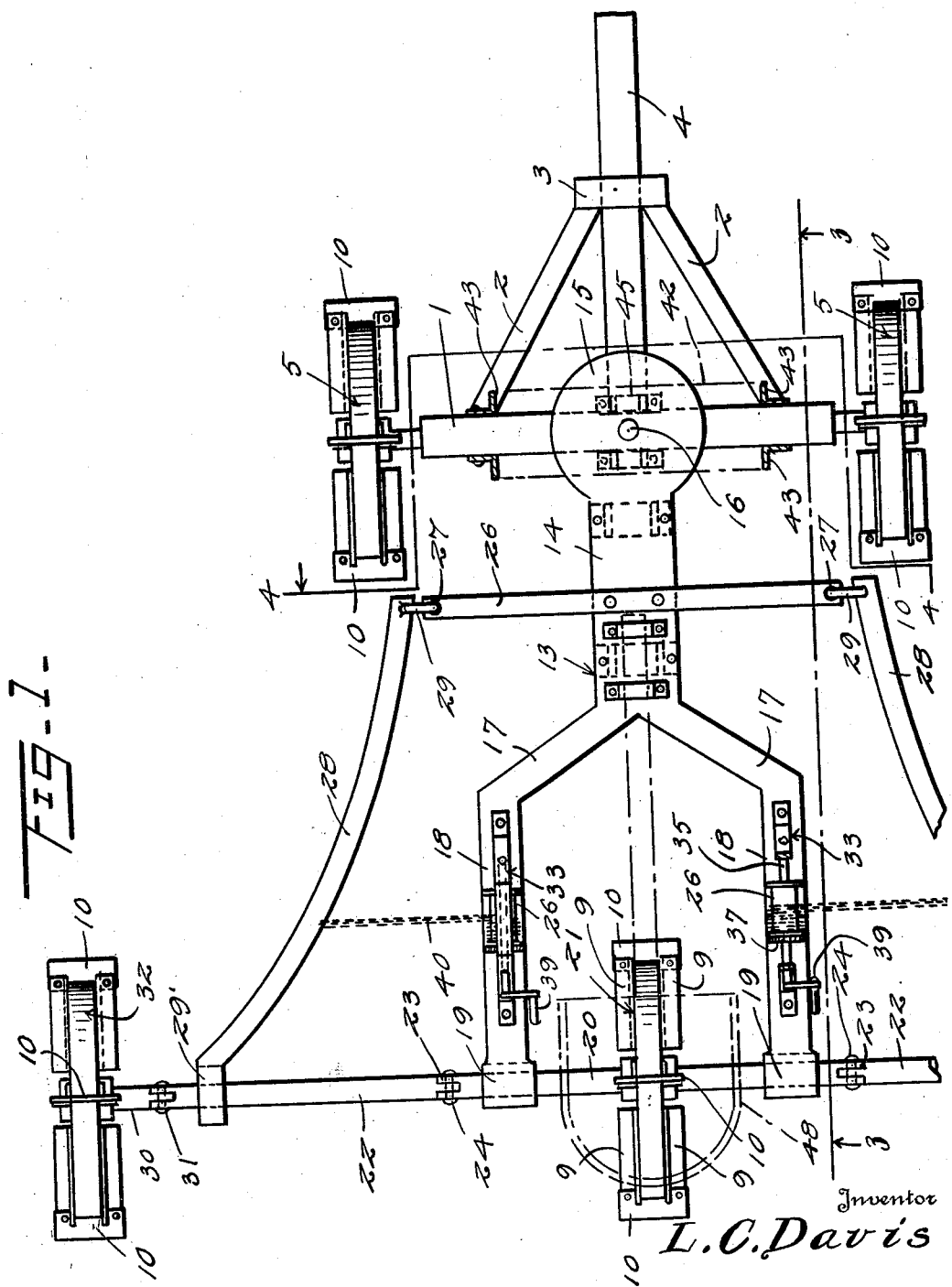

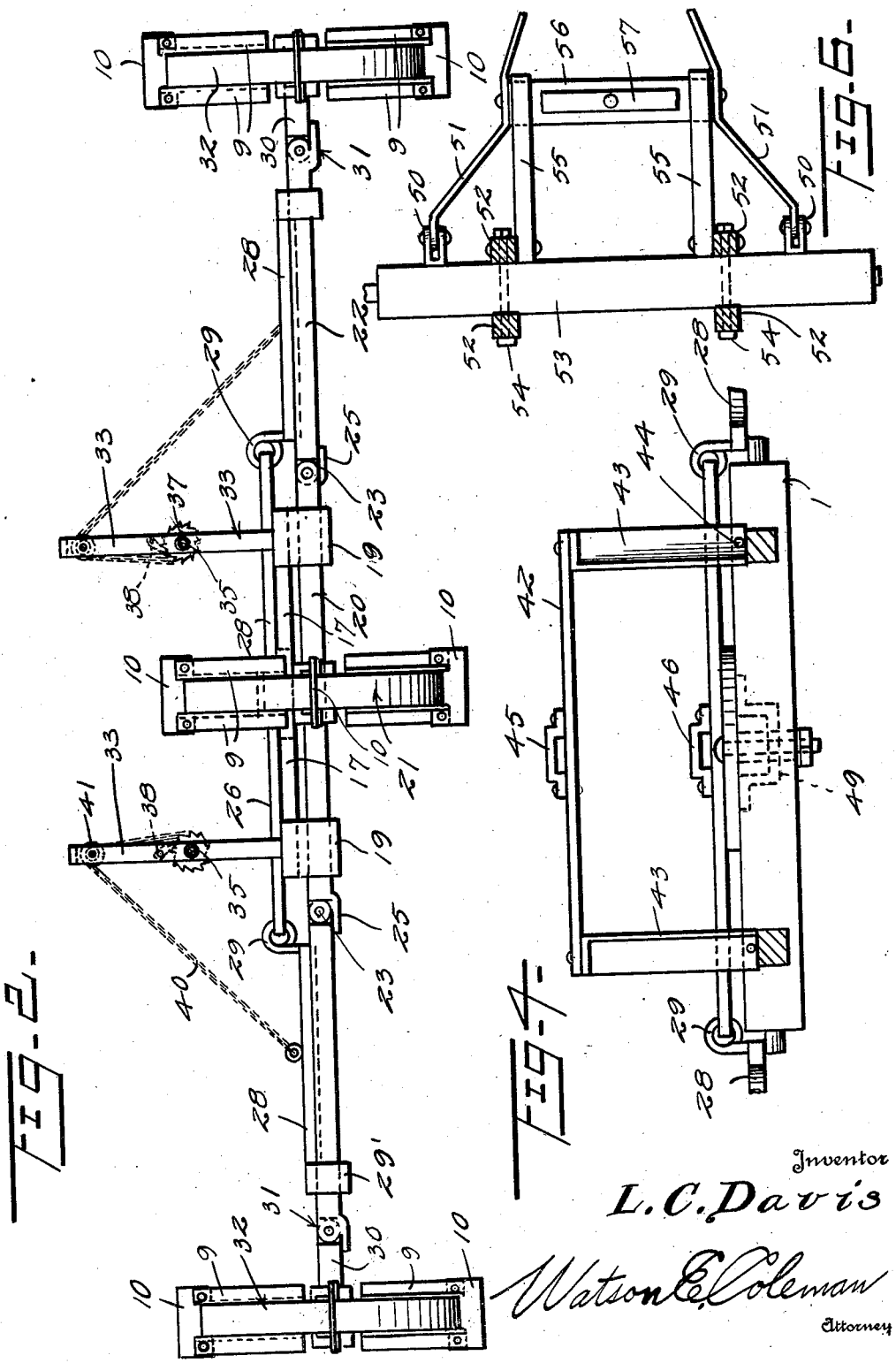

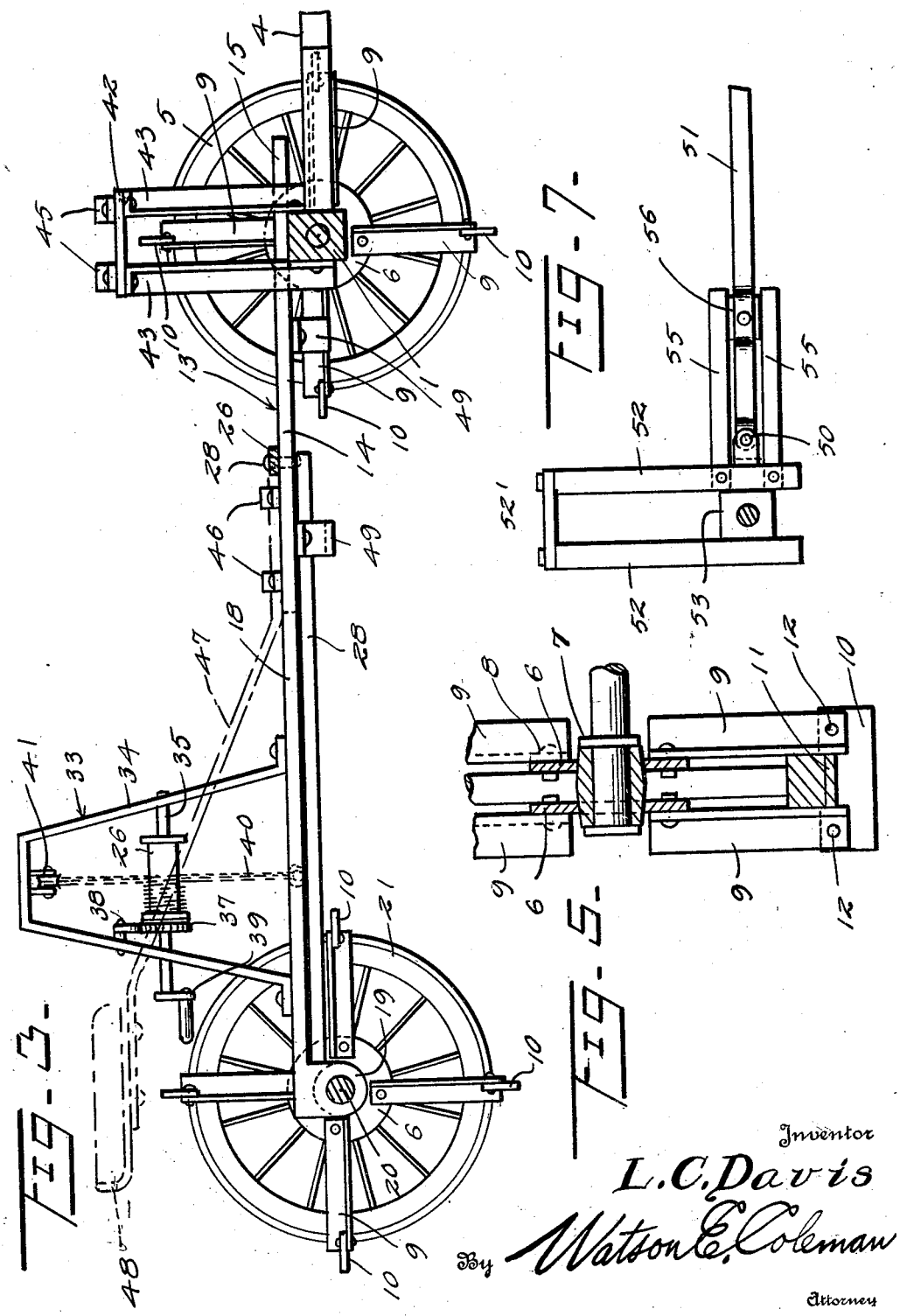

1,840,886

UNITED STATES PATENT OFFICE

LORENZO CLARK DAVIS, OF COLLEGE PARK, GEORGIA

CORN AND COTTON STALK OR STUBBLE CHOPPER

Application filed June 17, 1930. Serial No. 461,824.

This invention relates to improvements in corn and cotton stalk or stubble choppers.

The primary object of the present invention is to provide a chopper for corn or cotton stubble which may be attached to the front axle and bolster of an ordinary farm wagon, use being made of the wheels for the carrying of certain choppers provided for attachment thereto.

Another object of the invention is to provide a chopper of the above described character wherein a plurality of chopping knife carrying wheels is employed, the wheels being so disposed as to cover a relatively wide strip of ground.

Still another object of the invention is to provide a cotton chopper having a plurality of rotating chopper wheels, in which certain of the wheels may be swung in toward the center of the machine to permit the same to pass along roadways.

Other objects of the invention are to provide a chopper wherein the normally widely spaced wheels of a group may be brought closer together for working in narrow areas; to provide improved means for mounting an operator's seat upon the device; to provide improved means for bracing outlying lateral chopping wheels and to provide means whereby the complete machine which includes 5 chopping wheels, may be divided to provide two units one having three wheels and the other two.

The invention will be best understood from a consideration of the following detailed description taken in connection with the accompanying drawings, forming part of this specification, with the understanding, however, that the invention is not confined to any strict conformity with the showing of the drawings but may be changed or modified so long as such changes or modifications mark no material departure from the salient features of the invention as expressed in the appended claims herein.

In the drawings:—

Figure 1 is a view in top plan of a major portion of the machine embodying the present invention.

Figure 2 is a rear elevational view of the same.

Figure 3 is a longitudinal sectional view taken upon the line 3—3 of Figure 1.

Figure 4 is a transverse sectional view taken upon the line 4—4 of Figure 1.

Figure 5 is a transverse sectional view of one of the wheels showing the application of the cutter knives thereto.

Figure 6 is a view in plan of a holding device connected between a bolster and shafts pivotally attached thereto.

Figure 7 is a view in side elevation of the structure shown in Figure 6.

Referring more particularly to the drawings wherein like numerals of reference indicate corresponding parts throughout the several views, the numeral 1 indicates generally the front axle of the machine which consists of the axle of a farm wagon, the same being provided in the usual manner with the forwardly extending and converging braces or hounds 2 having connected therebetween at their forward ends the plates 3 between which the rear portion of a tongue 4 is extended for attachment to or extension through the body portion of the bolster 1 in the usual manner.

The wheels 5, which for use in the present machine must be of the flat type not dished as in the usual wagon wheel, each has applied to each face a metal plate or disk 6 through the central portion of which the hub 7 of the wheel extends. These plates are secured together by bolts 8 which pass therethrough and through the wheel between the spokes thereof.

Upon each face of the wheel 5 there is arranged a plurality of radially extending bars 9 of angle iron one side of each bar positioning against a plate 6 and secured thereto by one of the bolts 8 as shown in Figure 5 while the other end projects beyond the rim of the wheel as is also clearly shown in this figure.

At its outer end each of the angle bars has the flange lying against the wheel split a short distance inwardly to receive the rear edge of a cutter plate 10 which extends transversely of the wheel rim in the manner shown, the central portion of the rear edge of each cutter plate being notched or cut away to receive the wheel rim as indicated at 11. Suitable securing bolts 12 are passed through the cutter plates 10 and through the adjacent laterally extending flange of each of the angle bars to which the cutter plate is connected.

Adapted for connection to the axle structure 1 is an elongated frame indicated generally by the numeral 13. This frame comprises a flat body portion 14 having at its forward end the enlarged disk head 15 which rests upon the axle 1 and which is centrally apertured as at 16 for the reception of the wagon king bolt.

At the other end the body 14 has extended therefrom the lateral rearwardly diverging arms 17 each of which terminates in a straight rearward extension beam 18 which lies substantially parallel with the longitudinal center of the frame structure. Each of the beams 18 at its rear end terminates in a bearing 19 of suitable design for the reception of a central transverse axle 20.

Intermediate its ends and centrally positioned between the beams 18 the axle supports a chopper wheel indicated generally by the numeral 21 which wheel is of the same construction as each of the front wheels 5. At each of its outer ends the axle 20 has pivotally attached thereto one end of a supplemental axle 22, the pivotal connection which is indicated at 23 preferably being of a type which will permit each of the supplemental axles 22 to swing upwardly but will prevent their swinging down beyond the plane in which the axle 20 lies. The type of connection 23 here shown is substantially a mortise and tenon joint, the mortise being formed in the ends of the axle 20 and the tenons upon the axles 22 positioning therein, a suitable bolt or pivot pin 24 being passed therethrough as shown.

At the underside of the axle 20 at each end thereof is an extension 25 which underlies the adjacent end of a supplemental axle 22 to prevent its swinging downwardly as will be readily understood from a consideration of Figure 2.

Extending transversely of the body 14 is a beam 26 through each end of which an aperture 27 is formed which is in alignment longitudinally of the machine with the joint 23 between the axle 20 and supplemental axle 22.

Attached to each end of this beam 26 is an arcuate draw beam 28, the connection between the draw beam and the beam 26 being made by a ring 29 formed at one end of the draw beam and passed through the aperture in the adjacent beam 26 as shown in Figure 1. Each of these draw beams 28 curves outwardly from the machine and terminates in its outer or rear end in a collar 29' through which the outer end of the adjacent supplemental axle 22 passes.

The outer end of each of the supplemental axles 22 is provided with a suitable slot for the reception of a tenon projecting from an outer axle 30, the connection of the tenon of each of the outer axles with the adjacent end of the supplemental axle 22 forming a pivotal joint 31 of the same type as the joint 23. Each of the outer axles 30 has mounted thereon a chopping wheel 32 of the same construction as the wheels 5 and 21.

Mounted upon each of the beams 18 is an upright inverted substantially V-shaped frame indicated generally by the numeral 33. Each of the legs 34 thereof supports one end of a shaft 35 which is mounted therebetween and upon which is in turn mounted a drum 36 for the purpose hereinafter described. A ratchet 37 secured to the shaft and one end of the drum 36 is engaged by a pivotally mounted pawl 38 which holds the ratchet and drum against rotation in one direction. The rear end of the shaft 35 carries a crank 39 by means of which the shaft may be rotated to wind thereon one end of a chain 40. This chain passing from the drum upwardly to the top of the frame and over a pulley 41 carried by the frame from which it passes outwardly to the adjacent beam 28 to which it is attached.

Adapted to be mounted upon the axle 1 is a frame which has a top plate 42 to each end of which is secured one end of each of a pair of spaced angle bars 43 which are formed to receive between their spaced free ends the bolster 1. The separation of the angle bars 43 transversely of the machine may be such as to lock them so that they will rest upon the hounds 2 of the front axle assembly and in order to further strengthen their connection with the axle holding bolts or other suitable securing means 44 may be passed therethrough and through the body of the axle as shown in Figure 4. The plate 42 has secured to the top thereof intermediate its ends a pair of spaced brackets 45 beneath which the end of a seat supporting bar may be extended. Similar brackets 46 are mounted upon the body 14 of the frame 13 for the reception of the seat supporting bar when it is desired that the operator be positioned in the rear of the machine over the center chopping wheel 21. This seat supporting bar is shown in Figure 3 in dotted lines and is indicated by the numeral 47, the seat upon the rear end thereof being indicated by the numeral 48.

As is well known the tongue 4 of the usual two horse wagon is removable and in the event that the user of the machine wishes to dispense with the front two wheels 5 and use only the rear portion of the machine the tongue 4 may be removed and applied to the underside of the body 14 after, of course, the same is detached from the axle 1. In order to effect this coupling of the tongue with the body 14 a pair of spaced depending brackets 49 is secured against the underside of the body into which the rear end of the tongue may be slipped.

From the description of the machine thus given it will be seen that five positioning wheels are provided, the front positioning wheels 5 being so positioned as to run along a path passing between the center and the outer wheels at the back.

In transporting the machine from one place to another the drums 36 may be rotated to wind up thereon the chains 40 and thus lift the outer chopper wheels 32 to an elevated position so that the machine may pass along roadways or through narrow places. In addition to the adjustment which allows the outer wheels to be swung upwardly these wheels may be moved in to a position closer to the center chopping wheel 21 if desired by disassembling the hinge joints 23 and 31 and removing the supplemental axle 22 connecting the outer axles 30 directly to the center axle 20. With the wheels 32 shifted to this position the rear three wheels may be employed for chopping operations independently of the front structure which includes the axle 1 and the front chopper wheels 5.

While in the drawings the chopping wheels have been shown as provided with only four chopping blades each it is, of course, to be understood that I do not wish to be limited in any manner to the number of chopping blades employed for it is obvious that a greater number may be used and in actual practice each wheel has a chopper blade located between each pair of spokes.

From the foregoing description it will be readily seen that with a machine of the character herein described a relatively large area or strip of ground may be worked over and various adjustments may be made in the relative positions of the chopping wheels to enable the operator to use the machine in different positions.

The nature of the machine is such that these adjustments or changes in the relative positions of the wheels may be made easily and quickly. It will also be seen that the positioning blades 10 may be readily removed from any of the wheels, particularly the wheels 5 so that the same may be connected with a wagon body for use therewith as required.

In the foregoing structure there has been shown and illustrated a two horse draft mechanism in which the rear axle and chopping wheels may be removed so as to permit of the use of the front axle, bolster and chopping wheels alone. The hounds 2 are rigidly secured to the bolster so that the same may be drawn about on the wheels without danger of tipping forwardly.

In wagons where a pair of shafts is employed so that only a single horse may be hitched thereto, the shafts are hingedly attached to the bolster as indicated at 50, the shafts being indicated by the numerals 51. When both the front and rear wheels of a wagon of this construction are used the front bolster will, of course, maintain the proper upright position but if the rear wheels are disconnected and it is desired to use only the front wheels with the chopping blades thereon it will be readily seen that the bolster will tip over either toward the front or toward the rear. In order to prevent this so that the two front wheels of a vehicle of this character may be used independently of the rear wheels there is provided a frame structure consisting of a pair of uprights 52 connected at their upper ends by a cross member 52′ like the cross member 42 which is mounted upon the uprights 43 mounted on the structure previously described.

These uprights are arranged in spaced parallel relation and are separated the proper distance to snugly receive the bolster as shown, which bolster is indicated by the numeral 53. Removable bolts 54 are passed through the uprights 52 and through the bolster 53 to maintain the uprights in position thereon.

Connected to each of the forward uprights 52 is a pair of forwardly directed arms 55 which are disposed in vertically spaced relation and are designed to receive between their forward ends the cross connecting member 56 between the shafts 51, which member is, as is of course well known, secured at its ends to the shafts and carries the singletree 57. From this it will be readily seen that when the members 52 are mounted on and secured to the bolster 53 of the vehicle of the character described a rigid coupling will be established between the bolster and the shafts so that there will not be permitted any relative movement between the same and consequently the bolster with the two wheels attached thereto may be used independently of the rear wheels which are provided to be ordinarily used in association therewith without danger of having the bolster tip over.

While the structure shown in Figure 1 as associated with the draft member or frame 13 has been shown as attached to the bolster 1 which may have been removed from a wagon structure, it is, of course, to be understood that the portion 15 of the structure 13 may be directly connected to the rear of a wagon body or other wheeled structure and drawn over the field for the accomplishment of a stalk chopping operation.

Having thus described my invention, what I claim is:—

1. A cotton chopper comprising a frame structure having front and rear axles, chopping wheels carried by each of said axles, and means for vertically adjusting certain of the chopping wheels of one of the axles relative to the other wheels.

2. A cotton chopper comprising an axle, a chopping wheel upon each end thereof, a frame pivotally attached to the axle to swing in a horizontal plane, a rear axle carried by said frame, and a chopping wheel carried by said rear axle in a position to travel along a path between the first mentioned wheels.

3. A cotton chopper comprising an axle, a chopping wheel upon each end thereof, a frame pivotally attached to the axle, a rear axle carried by said frame, a chopping wheel carried by said rear axle in a position to travel along a path between the first mentioned wheels, and lateral chopping wheels arranged outwardly of the ends of said rear axle and operatively connected therewith.

4. A cotton chopper comprising an axle, a chopping wheel upon each end thereof, a frame pivotally attached to the axle, a rear axle carried by said frame, a chopping wheel carried by said rear axle in a position to travel along a path between the first mentioned wheels, lateral supplemental axles connected to the ends of said rear axle, and chopping wheels carried at the outer ends of the supplemental axles, said supplemental axles having pivotal connection with said rear axle to permit shifting of the outer chopping wheels relative thereto.

5. A cotton chopper comprising an axle, a chopping wheel upon each end thereof, a frame pivotally attached to the axle, a rear axle carried by said frame, a chopping wheel carried by said rear axle in a position to travel along a path between the first mentioned wheels, lateral supplemental axles connected to the ends of said rear axle, chopping wheels carried at the outer ends of the supplemental axles, pivotal connecting means between each of the supplemental axles and said rear axle, and means for swinging upwardly said supplemental axles and the chopping wheels attached to the outer ends thereof.

6. A cotton chopper comprising a front axle, knife carrying chopping wheels pivotally mounted upon said axle, an elongated frame having pivotal connection at one end with the central portion of said axle, means at the other end of said frame to provide a pair of bearings, an axle mounted between said bearings and carrying a third chopping wheel, chopping wheels operatively connected to and positioned laterally of the third chopping wheel, and means whereby said lateral chopping wheels may be swung in a vertical plane upon and over the frame carrying axle.

7. A cotton chopper comprising a main front axle, a knife carrying chopping wheel mounted on each end of said axle, a frame structure comprising an elongated body portion having a circular head adapted for pivotal connection with said axle and spaced rearwardly extending substantially parallel beams, a rear axle connecting said beams at the rear ends thereof, a chopping wheel carried by the rear axle between the beams, supplemental lateral axles pivotally attached to said rear axle, a pull beam at each side of said frame having pivotal connection at one end with the body portion thereof and at the other end connecting with the outer end of the adjacent supplemental axle, and chopping wheels connected to the outer ends of the supplemental axles.

8. A cotton chopper comprising a main front axle, a knife carrying chopping wheel mounted on each end of said axle, a frame structure comprising an elongated body portion having a circular head adapted for pivotal connection with said axle and spaced rearwardly extending substantially parallel beams, a rear axle connecting said beams at the rear ends thereof, a chopping wheel carried by the rear axle between the beams, supplemental lateral axles pivotally attached to said rear axle, a pull beam at each side of said frame having pivotal connection at one end with the body portion thereof and at the other end connecting with the outer end of the adjacent supplemental axle, outer axles each having pivotal connection at one end with the outer end of a supplemental axle, and a chopping wheel carried by each of said outer axles.

9. A cotton chopper comprising a main front axle, a knife carrying chopping wheel mounted on each end of said axle, a frame structure comprising an elongated body portion having a circular head adapted for pivotal connection with said axle and spaced rearwardly extending substantially parallel beams, a rear axle connecting said beams at the rear ends thereof, a chopping wheel carried by the rear axle between the beams, supplemental lateral axles pivotally attached to said rear axle, a pull beam at each side of said frame having pivotal connection at one end with the body portion thereof and at the other end connecting with the outer end of the adjacent supplemental axle, outer axles each having pivotal connection at one end with the outer end of a supplemental axle, a chopping wheel carried by each of said outer axles, and means for swinging said draw beams upwardly to raise said outer axles and the wheels carried thereby to an elevated position.

10. A cotton chopper comprising a main front axle, a knife carrying chopping wheel mounted on each end of said axle, a frame structure comprising an elongated body portion having a circular head adapted for pivotal connection with said axle and spaced rearwardly extending substantially parallel beams, a rear axle connecting said beams at the rear ends thereof, a chopping wheel carried by the rear axle between the beams, supplemental lateral axles pivotally attached to said rear axle, a pull beam at each side of said frame having pivotal connection at one end with the body portion theerof and at the other end connecting with the outer end of the adjacent supplemental axle, outer axles each having pivotal connection at one end with the outer end of a supplemental axle, a chopping wheel carried by each of said outer axles, a drum rotatably mounted upon each of said frame beams, means for rotating the drum, and a pull chain connecting each drum with the adjacent pull beam for swinging the same upwardly and lifting said outer chopping wheels.

11. In a cotton chopper, a chopping wheel comprising a wheel body including a hub, spokes radiating therefrom and a rim connecting said spokes, plate bodies applied to the opposite faces of the wheel and formed to receive the hub, radially extending bars overlying each side of the wheel body and each connected at its inner end to a plate, and chopping knives extending transversely of the wheel rim and connected at each end to the outer end of a bar.

12. In a cotton chopper, a chopping wheel comprising a wheel body including a hub, spokes radiating therefrom and a rim connecting said spokes, plate bodies applied to the opposite faces of the wheel and formed to receive the hub, radially extending angle bars overlying each side of the wheel each having one portion thereof bearing against a plate body and secured thereto and the other portion projecting laterally from the face of the wheel, each of said angle bars extending outwardly beyond the periphery of the wheel and having that portion lying against the wheel provided with a longitudinally extending slot, and chopping blades extending transversely of the rim of the wheel and positioned in the slots of two opposed bars and secured to the laterally projecting portions thereof.

13. A cotton chopper adapted for attachment to a wheeled vehicle, comprising a draft element forked at one end, an axle carried between said forked ends, an axle extension pivotally connected to each end of said axle, a cotton chopping wheel mounted upon said axle between said forks, a cotton chopping wheel mounted upon each of said axle extensions, a connecting element between each of said extensions and the forward part of said draft element, and means for swinging said axle extensions upwardly upon their pivot connections with said axle, for the purpose of reducing the width of the chopper.

14. In a corn and cotton stubble chopper, a frame comprising an elongated body, a pair of transversely directed bearings at one end of the body, an axle mounted in said bearings, a chopping wheel carried by said axle between said bearings, a chopping wheel carried by and at each end of the axle, and brackets carried by the body of said frame, adapted to receive one end of a draft tongue.

In testimony whereof I hereunto affix my signature.

LORENZO CLARK DAVIS.